F. J. FALDING.
PROCESS OF PURIFYING GAS AND RECOVERING AMMONIA, &c., THEREFROM.
APPLICATION FILED FEB. 26, 1906.
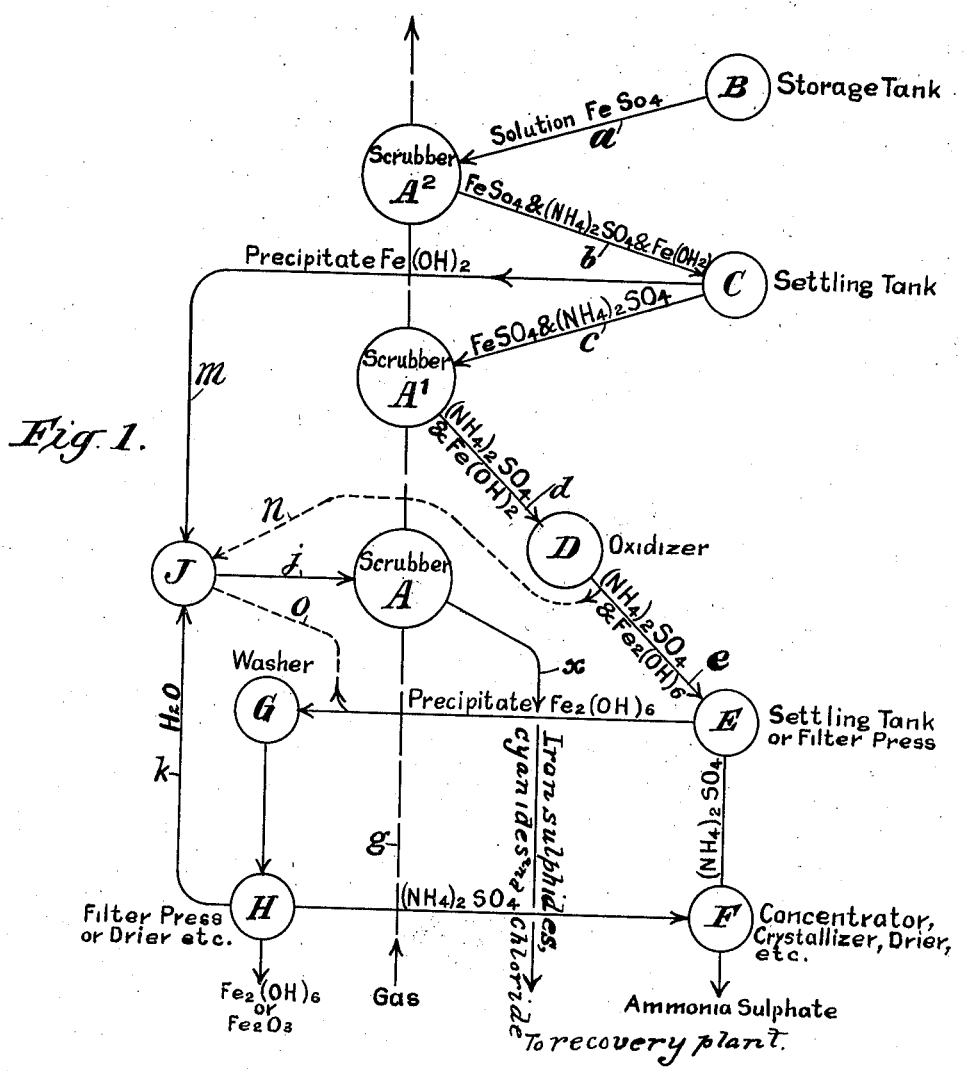
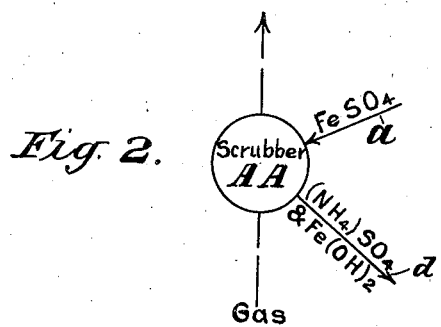

UNITED STATES PATENT OFFICE.

FREDERIC J. FALDING, OF NEW YORK, N. Y., ASSIGNOR OF ONE-HALF TO WILLIAM RICHARD CATHCART, OF MAYWOOD, NEW JERSEY.

PROCESS OF PURIFYING GAS AND RECOVERING AMMONIA, &c., THEREFROM.

961,763.

Specification of Letters Patent.   Patented June 21, 1910.

Application filed February 26, 1906. Serial No. 302,914.

*To all whom it may concern:*

Be it known that I, FREDERIC J. FALDING, a citizen of the United States, residing at New York city, county of Kings, and State of New York, have invented certain new and useful Improvements in Processes of Purifying Gas and Recovering Ammonia and other Substances Therefrom, fully described and represented in the following specification and the accompanying drawings, forming a part of the same.

This invention relates to a process for purifying gases produced by the distillation or combustion of coal and other organic matters, and for recovering values present in the gases as impurities. The invention in the preferred manner of carrying it into practice also provides for the recovery of values contained in waste pickling liquor resulting from the washing of iron and steel in weak acid solutions and for abating the nuisance constituted by such waste pickling liquor.

Gases produced by the distillation or combustion of coal and other organic matter contain various substances, principally ammonia, sulfur and tar, together with more or less cyanogen and chlorin in various forms, which substances are separated out from the gas in the process of purification and form valuable by-products. In the usual method of purification, the gas after passing through the tar separator is subjected to a process of scrubbing with water, the water cooling the gas and taking from it these and other impurities, and this wash water containing ammonia, sulfur, cyanogen and chlorin in various forms in solution is known as crude gas liquor. The recovering of the values contained in this crude gas liquor involves the addition thereto of a chemical substance for breaking up the fixed ammonia compounds. Lime has been almost universally used heretofore for this purpose, and the process involves the use of a large excess of lime over the amount theoretically required, and the waste lime liquor retains the sulfur in an unavailable form and some of the ammonia together with valuable cyanids, and forms troublesome crusts in the apparatus and constitutes a nuisance difficult to dispose of. Furthermore the scrubbing of the gas with water does not effect a complete purification, and the gas after leaving the scrubber or scrubbers is passed through a dry purifier for the purpose of removing the ammonia, sulfur and cyanogen remaining in the gas, and also for taking up carbonic acid from the gas. The most valuable constituent of this gas liquor is the ammonia, and such gas liquor forms the principal source of supply of ammonia in its various forms. The cost of producing ammonia by the process above referred to, however, has been such as to limit its use to a large extent. In the production of sulfate of ammonia, especially, the principal use of which is as a fertilizer, the cost, which includes the addition of sulfuric acid to the ammonia, has been such as to practically prevent the use of sulfate of ammonia for this purpose to anything like the extent to which it would have been used if the cost of production were lower.

At the present time much of the supply of gas liquor in the United States for the production of ammonia is a by-product of the metallurgy of iron and steel, principally from the scrubbing of gas from by-product coke ovens, although gas from blast furnaces forms a potential, though heretofore unutilized, source of crude gas liquor.

In preparing iron or steel sheets, tubes, wire, castings, forgings, etc., for galvanizing or tinning, or simply for the purpose of cleaning such sheets, etc., a weak aqueous solution of acid is used, usually sulfuric acid, sometimes hydrochloric acid, sometimes other acids. The various oxids of iron formed on the steel and iron from the contact of the hot metal with air and moisture, together with some of the metal itself, go into solution with the acid and water as ferrous and ferric sulfates if sulfuric acid is used, and as ferrous and ferric chlorids if hydrochloric acid is used. Fresh acid may be added to this pickling liquor, as it is called, until the liquor becomes too dirty for further use, when it must be replaced in part or in whole by fresh acid solution. The old solution, known as waste pickling liquor, then constitutes a waste product containing iron salts with some free acid. Heretofore the only use found for this liquor has been to add scrap iron until the solution is entirely neutral and to concentrate and recover the iron salts, or to precipitate the iron by means of lime. These products are principally valuable for the production of paint materials, but their use is strictly limited and their production is costly. These liquors, therefore, have heretofore been mainly run to waste, involving the loss of large quantities of acid, iron and water, and this waste also constitutes a nuisance difficult to dispose of.

The object of the present invention is to provide an improved gas purification process whereby the ammonia, sulfur, cyanogen and chlorin values are completely removed from the gases in the process of scrubbing and the subsequent passage of the gas through a dry purifier for completing the removal of said impurities is rendered unnecessary, and to provide a process whereby the ammonia on the one hand and the sulfur and other values taken from the gas on the other hand may be readily separately recovered without the necessity of further expensive and objectionable treatment of the wash liquor involving the use and waste of lime and the creation of a nuisance.

The invention also aims further to provide a process for recovering at the same time the values, both acid and iron, contained in the waste pickling liquor, and whereby the nuisance constituted by such waste pickling liquor will be abated.

To these ends I use in place of water for scrubbing the gases, an aqueous solution of an iron salt, (for example, iron sulfate or iron chlorid) with the result that the acid combined with the iron in the scrubbing solution will leave the iron and unite with the ammonia contained in the gas to form an ammonium salt and the iron will be precipitated either as hydroxid or in combination with the sulfur, cyanogen, chlorin and other impurities which may be contained in the gas. The ammonium salt thus formed being soluble will remain in solution in the wash water, and the other values taken from the gas will be in the form of insoluble precipitates, so that the two products, the ammonium salt and the impure precipitate of iron, may readily be separately recovered.

Unless the gas contains a large proportionate amount of sulfids, it will preferably be subjected to a preliminary scrubbing with a solution containing a relatively small amount of the iron salt, or with ferrous or ferric hydroxid in suspension in water, for the purpose of breaking up or retaining the sulfids, cyanids and chlorid, etc., and separating from the gas the sulfur, cyanogen and chlorin, etc. The gas will then pass on to be scrubbed with the solution of iron salt for taking from the gas its ammonia. The wash water from this main scrubbing operation will then contain ammonium salt in solution, and iron hydroxid. The iron hydroxid, as formed, may be partly soluble, but any soluble iron hydroxid may be readily converted into an insoluble hydroxid by subjecting the wash liquor to a suitable process of oxidation. The insoluble precipitate thus obtained may then be readily separated from the solution of ammonium sulfate, and the two products thus separately recovered without difficulty. I preferably use for this scrubbing liquid the waste pickling liquor above referred to, and the use of waste pickling liquor for this purpose forms a feature of the invention. This pickling liquor when of the sulfate form, that is, when sulfuric acid has been used for the purpose of cleaning the iron or steel, consists of a dilute solution of ferrous sulfate, $FeSO_4$, some free sulfuric acid and ferric sulfate, $Fe_2(SO_4)_3$, being also present with various minor impurities. If of the chlorid form, that is, if hydrochloric acid were used in the cleaning process, the pickling liquor consists of a solution of ferrous and ferric chlorid with some free hydrochloric acid.

The re-actions on which the process is based are analogous whatever iron salt may be used for the purpose of scrubbing the gases. Supposing an iron sulfate solution to be used, and having in mind especially the use of waste pickling liquor of the sulfate form, the principal re-actions upon which the process is based are as follows:—If ammonia, $NH_3$, is added to a solution of ferrous sulfate, the following re-action will take place.

(1) 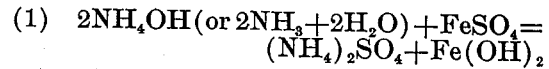
$$2NH_4OH (\text{or } 2NH_3+2H_2O)+FeSO_4=\\(NH_4)_2SO_4+Fe(OH)_2$$

The ammonium sulfate will remain in solution and the ferrous hydrate will be only partially precipitated, it being soluble in the presence of ammonium salt. If the solution is subjected to the action of an oxidizing agent, as by passing a current of air through it while heated, the ferrous hydrate will be converted into ferric hydrate or some intermediate oxidation product or a mixture of such products, for example (2) 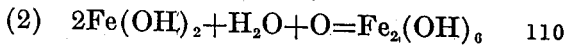
$$2Fe(OH)_2+H_2O+O=Fe_2(OH)_6$$

and—

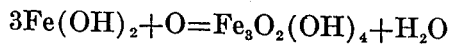
$$3Fe(OH)_2+O=Fe_3O_2(OH)_4+H_2O$$

These ferric and ferroso-ferric hydrates are insoluble in the presence of ammonium salts and therefore precipitate completely.

If a solution of ferrous sulfate containing sulfuric acid is oxidized by air or other oxidizing agent with heat, the ferrous sulfate will be converted into ferric sulfate.

(3) 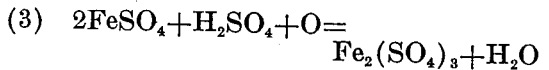
$$2FeSO_4+H_2SO_4+O=\\Fe_2(SO_4)_3+H_2O$$

and if ammonia be then added to the oxidized solution the following re-action will take place.

(4) 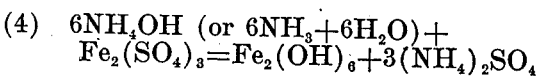
$$6NH_4OH (\text{or } 6NH_3+6H_2O)+\\Fe_2(SO_4)_3=Fe_2(OH)_6+3(NH_4)_2SO_4$$

Ferric hydrate combined with ammonium sulfid produces ferrous sulfid together with ammonium hydrate and free sulfur.

(5) $Fe_2(OH)_6 + 3(NH_4)_2S = 2FeS + 6(NH_4)OH + S$ or—

$Fe_2(OH)_6 + 3H_2S + 6NH_3 = 2FeS + 6NH_3 + 6H_2O + S$

In a freshly precipitated solution, ferrous sulfid suffers dissociation as follows.

(6) $FeS + 2H_2O = Fe(OH)_2 + H_2S$ (7) $2Fe(OH)_2 + H_2S + O = Fe_2(OH)_6 + S$

Ferrous sulfid in the presence of an oxidizing current of air becomes ferrous sulfate.

(8) $FeS + 2O_2 = FeSO_4$

Sulfur contained in ammonium sulfid may thus be recovered as ammonium sulfate by the re-action shown by equation 1.

A clear understanding of the invention can best be given by describing a preferred manner of carrying it into operation, and a modification thereof, in connection with the accompanying diagrams, of which—

Figure 1 is intended to illustrate a preferred way of carrying out the process when the amount of sulfids in the gas to be purified is small compared to the amount of ammonia therein, and Fig. 2 illustrates a simplified process which may preferably be used when the gas contains a larger proportionate amount of sulfids.

Referring first to Fig. 1, the process as illustrated by this diagram calls for the use of a plurality of scrubbers, or scrubbing chambers or compartments A, A' and A². Scrubbers of any suitable form may be employed and the number may be varied as may be found desirable. There will be, however, a preliminary scrubber, A in the diagram, and one or more main scrubbers, preferably two, A' and A² in the diagram. The dotted line g represents the path of the gas which, after having preferably been freed of its tar in the usual way, passes first into the scrubber A, then from scrubber A to scrubber A' and thence to the scrubber A² from which the gas passes fully purified. In the preliminary scrubber A the gas has its maximum temperature and is relieved of its sulfids, cyanids and chlorid, etc.; and in the main scrubbers A' and A² the ammonia is taken from the gas, and the gas will then leave the scrubber A² completely freed of its ammonia, sulfur, cyanogen and chlorin constituents, as well as all other impurities which it may contain, with the possible exception of carbon dioxid, which it may be necessary to take from the gas by further treatment before sending it to the mains.

Supposing waste pickling liquor of the sulfate form or other solution of ferrous sulfate to be used for scrubbing the gas, and following the successive steps of the process in the direction the reverse to that of the flow of the gas through the scrubbers;—the scrubbing solution will pass from a suitable source, as the storage tank B, to the scrubber A², as indicated by the line a. In the scrubber A² the solution of ferrous sulfate will meet the partially purified gas and the gas will be completely freed of the ammonia which it has retained on leaving the scrubber A', the ammonia combining with part of the ferrous sulfate in the scrubbing solution to form ammonium sulfate and ferrous hydroxid with some ferric hydroxid, the ferrous hydroxid being partly soluble and partly insoluble in the presence of ammonium sulfate. The scrubbing liquor will be supplied in such quantities, however, and of such strength, that its sulfuric acid will not be entirely transformed into ammonium sulfate in the scrubber A². The scrubbing liquor, therefore, as it leaves the scrubber A² will consist of a solution of ferrous sulfate and ammonium sulfate with iron hydroxid partly soluble and partly insoluble. This scrubbing liquor may then go directly to the scrubber A' or may and preferably will first go, as indicated by the line b, to a settling tank C for separating from the solution the insoluble ferrous hydroxid. From the settling tank C the scrubbing solution then passes to the scrubber A' as indicated by the line c. In this scrubber it will meet the gas which has been freed of its sulfids, cyanids and chlorid, etc. in the preliminary scrubber A but which retains all or practically all of its ammonia, and the sulfuric acid will here be entirely converted into ammonium sulfate and the wash liquor as it leaves the scrubber A' will consist of a solution of ammonium sulfate and soluble iron hydroxid with some insoluble iron hydroxid. This wash liquor is then preferably oxidized to convert the soluble iron hydroxid into insoluble iron hydroxid.

As shown by the diagram the wash liquor preferably passes from the scrubber A', as indicated by the line d, to the oxidizer D, and thence as indicated by line e to a settling tank or filter press E for the purpose of separating the precipitate of iron hydroxid from the ammonium sulfate solution. The ammonium sulfate solution then goes to a concentrating, crystallizing and drying apparatus F, and the precipitate of iron hydrates is treated for recovering the iron hydrates, as by being passed through a washer G, the wash water which will contain a small quantity of ammonium sulfate in solution and the iron hydrates in suspension, then going to a filter press H for the separation of the iron hydrates from the solution. The weak ammonium sulfate solution may then pass from the filter press H to the concentrating, crystallizing and drying apparatus F.

The scrubbing liquor for the preliminary scrubber A, shown in the diagram by line $j$ as passing to the scrubber from a tank J, is preferably formed by wash water taken from the filter press H, as indicated by line $k$, together with ferrous hydrate which may be taken from the settling tank C, as indicated by line $m$, and mixed with the wash water in the tank J. Instead of this, however, fresh pickling liquor or a solution of ferrous sulfate might be used for the preliminary scrubbing in the scrubber A; or part of the solution of ammonium sulfate with ferric hydrate in suspension might be diverted for this purpose after leaving the oxidizer D, as indicated by dotted line $n$; or again part of the precipitate of ferric hydrate taken from the settling tank or filter press E might be taken to the tank J, as indicated by dotted line $o$, and there mixed with the wash water from the filter press H or other suitable liquor. In this preliminary scrubbing in the scrubber A, the sulfids, cyanids and chlorid contained in the gas will be broken up and the sulfur, cyanogen and chlorin will combine with the iron to form iron sulfids, cyanids and chlorid, etc. The wash liquor from the scrubber A containing soluble and insoluble compounds may then be worked up separately for the recovery of the various values present, this wash liquor being removed to a suitable recovery plant as indicated by line $x$.

By the process as above described and as illustrated by the diagram, Fig. 1, not only is a better purification of gas obtained, but at the same time there is effected a separate recovery of the ammonia from the gas in the form of an ammonium salt, this involving the recovery of acid from the pickling liquor. The iron also from the pickling liquor or other iron salt solution used for scrubbing the gas is separately recovered in a form suitable for metallurgical and other purposes.

If the gas to be purified contains a proportionately large amount of sulfids it may be preferable to omit the preliminary scrubbing of the gas by which the gas is freed of its sulfids, cyanids and chlorid, and to take the sulfids together with the cyanids and chlorid from the gas in the main scrubbing operation, letting the iron sulfids, etc., mix with the iron hydroxids. This manner of carrying out the process is illustrated by the diagram, Fig. 2. This diagram shows a single scrubber AA, although it will be understood that two scrubbers might be used, as shown in the diagram, Fig. 1, or more as found necessary, the gas passing through the scrubbers successively. As shown by the diagram, the ferrous sulfate solution enters the scrubber as indicated by the line $a$, and the ammonia contained in the gas will combine with the ferrous sulfate forming a solution of ammonium sulfate containing the iron and the various impurities of the gas both soluble and insoluble. This mixture of soluble and insoluble compounds can then be treated for the recovery of its values.

If a solution of ferric sulfate were used instead of a solution of ferrous sulfate for scrubbing the gas, the results would be substantially the same (see equation No. 4), except that the iron hydroxid produced would all be of the ferric or insoluble form, making the use of the oxidizer D unnecessary. As before stated, the sulfate pickling liquor contains both ferric and ferrous sulfate, although the latter is greatly in excess of the former.

If solutions of other iron salts were used for scrubbing the gas, analogous re-actions would take place, and the results obtained would be substantially the same, except that the ammonium salt recovered would vary according to the acid contained in the iron salt employed.

What is claimed:—

1. The improvement in the art of purifying gas and recovering values present in the gas as impurities, which consists in scrubbing the gas with a solution of an iron salt, thereby producing a wash liquor containing an ammonium salt in solution and iron hydrate, and subjecting such wash liquor to the action of an oxidizing agent to convert the soluble iron hydrate into iron hydrate which is insoluble in the presence of ammonium salt and thereby causing all the iron to precipitate.

2. The improvement in the art of purifying gas and recovering values present in the gas as impurities, which consists in first freeing the gas of its sulfur, cyanogen and chlorin, and then scrubbing the gas with a solution of an iron salt, thereby producing a wash liquor containing an ammonium salt in solution and iron hydrate, subjecting the wash liquor to the action of an oxidizing agent to convert the soluble iron hydrate into iron hydrate which is insoluble in the presence of ammonium salt and thereby causing all the iron to precipitate, separating the precipitate from the solution, and recovering the ammonium salt from the solution.

3. The improvement in the art of purifying gas and recovering values present in the gas as impurities, which consists in first scrubbing the gas with a liquid containing iron hydrate to free the gas of its sulfur, cyanogen and chlorin, and then scrubbing the gas with iron pickling liquor, thereby producing a wash liquor containing an ammonium salt in solution and iron hydrate, subjecting the wash liquor to the action of an oxidizing agent to convert the soluble iron hydrate into iron hydrate which is insoluble in the presence of ammonium salt and thereby causing all the iron to precipitate, separating the precipitate from the solution, and recovering the ammonium salt from the solution.

4. The improvement in the art of purifying gas and recovering values present in the gas as impurities, which consists in subjecting the gas successively to a preliminary scrubbing operation and one or more main scrubbing operations, the main scrubbing operation or operations being with a solution of an iron salt, and the preliminary scrubbing operation being with a liquid containing iron hydrate taken from the wash liquor resulting from the main scrubbing operations.

5. The improvement in the art of purifying gas and recovering values present in the gas as impurities, which consists in subjecting the gas to a preliminary scrubbing with a substance adapted to take from the gas sulfur, cyanogen and chlorin, and then subjecting the gas to a plurality of successive scrubbing operations, one of which is with a solution of an iron salt and a preceding one of which is with the wash liquor from said scrubbing with the solution of an iron salt.

6. The improvement in the art of purifying gas and recovering values present in the gas as impurities, which consists in subjecting the gas successively to a preliminary scrubbing operation and a plurality of main scrubbing operations, one of such main scrubbing operations being with a solution of an iron salt, a preceding one of such main scrubbing operations being with the wash liquor from said scrubbing with the solution of an iron salt, and the preliminary scrubbing being with a liquid containing iron hydrate taken from the wash liquor from one of the main scrubbing operations.

7. The improvement in the art of purifying gas and recovering values present in the gas as impurities, which consists in subjecting the gas to a preliminary scrubbing operation and one or more main scrubbing operations, such main scrubbing operation or operations being with an iron pickling liquor, and the preliminary scrubbing operation being with a liquid containing iron hydrate taken from the wash liquor from the main scrubbing operations.

In testimony whereof, I have hereunto set my hand, in the presence of two subscribing witnesses.

FREDERIC J. FALDING.

Witnesses:
  A. L. KENT,
  J. A. GRAVES.